(12) United States Patent
Remer et al.

(10) Patent No.: US 6,367,037 B1
(45) Date of Patent: Apr. 2, 2002

(54) DATA COLLECTION AGENT FOR COMPUTER NETWORKS

(75) Inventors: Eric B. Remer, Amerian Fork; Gregory P. Olsen, Lindon, both of UT (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/209,259

(22) Filed: Dec. 10, 1998

(51) Int. Cl.[7] ................................................. G06F 11/00
(52) U.S. Cl. .......................... 714/47; 714/39; 710/105
(58) Field of Search ...................... 714/47, 45, 39; 709/223, 224, 313, 203, 328; 710/105, 15; 707/1; 702/186; 370/908; 340/825.06

(56) References Cited

U.S. PATENT DOCUMENTS

| | | | | |
|---|---|---|---|---|
| 3,906,454 | A | * | 9/1975 | Martin |
| 5,187,787 | A | * | 2/1993 | Skeen et al. |
| 5,581,482 | A | * | 12/1996 | Wiedenman et al. |
| 5,867,643 | A | * | 2/1999 | Sutton |
| 6,122,639 | A | * | 9/2000 | Babu et al. |
| 6,233,612 | B1 | * | 5/2001 | Fruchtman et al. |

* cited by examiner

*Primary Examiner*—Gopal C. Ray
(74) *Attorney, Agent, or Firm*—Kenyon & Kenyon

(57) ABSTRACT

A data collection system for a computer network in which a data collection agent has a harmonization library and a plurality of data sources are distributed throughout the computer network. The data collection agent is provided in communication with the data sources via components' instrumentation entities.

17 Claims, 4 Drawing Sheets

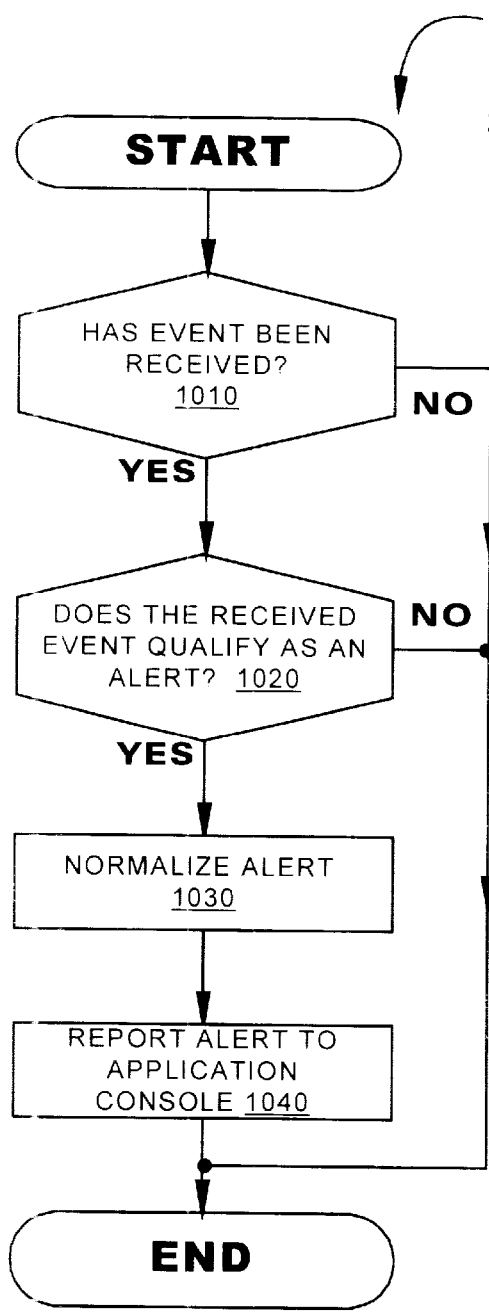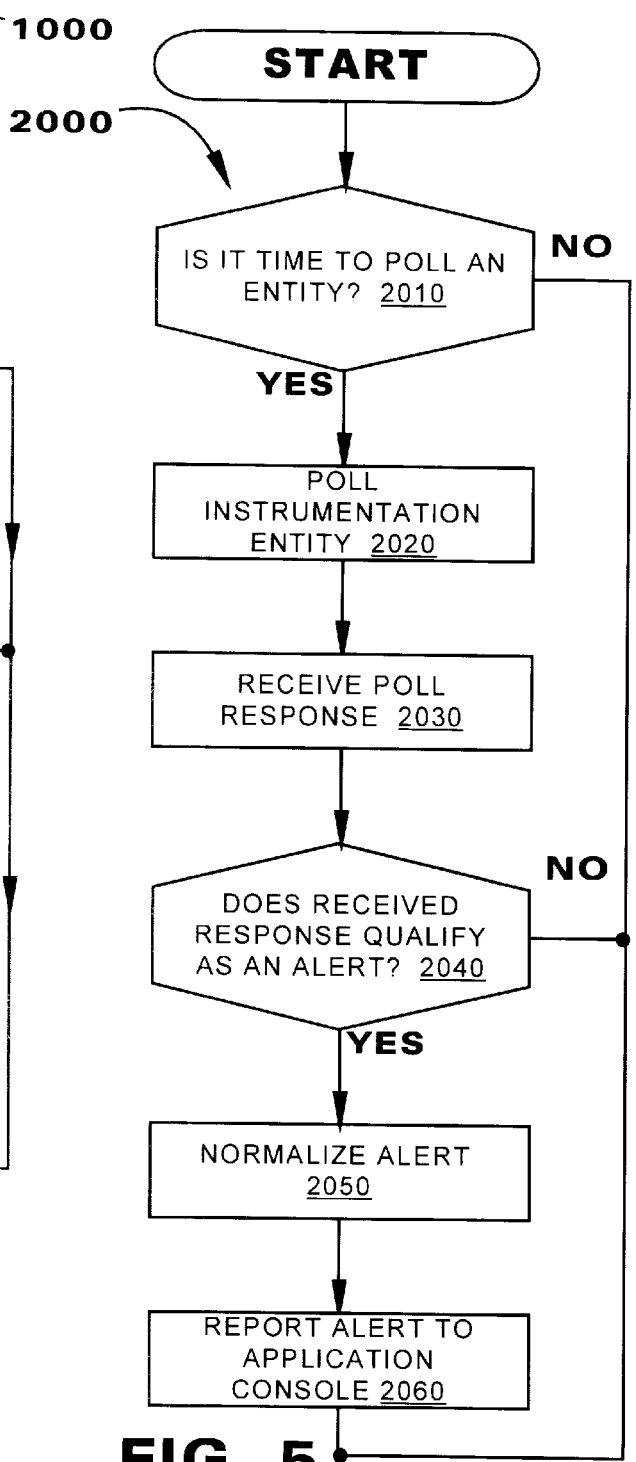
FIG. 4
FIG. 5

DATA COLLECTION AGENT FOR COMPUTER NETWORKS

BACKGROUND

Computer networks have become commonplace in modern times. There are a variety of network topologies and protocols that permit network servers, terminals and peripheral devices (collectively, "components") to interoperate and provide coordinated computer services. To support computer networks, firms often employ information technology technicians to monitor the state of the computer networks and maintain network components in an operable state.

To provide the technician with sufficient information to permit the technician to perform its function, individual network components may include "instrumentation entities" that can determine the component's operating condition. The instrumentation entity generates alert messages regarding parameters such as central processing unit ("CPU") utilization, memory usage, and available memory size. The types of parameters that are reported vary widely and depend upon the type of component being used, the operations being performed by the component and the parameters that are relevant to the component's operation. Some instrumentation entities may generate an alert when parameters indicate a condition that threatens the component's ability to operate. Other instrumentation entities monitor parameters but do not generate alerts therefrom. The events may be predetermined by a manufacturer of the component and are not defined by the technician or some other user of the computer network.

There are a variety of known instrumentation entities. They include:

The Desktop Management Interface, a known instrument entity described, at the time of this writing at http:\\www.dmtf.org;

The Simple Network Management Protocol ("SNMP"), a known instrumentation entity described at the time of this writing at http:\\www.ietf.org; and Various operating system instrumentation entities. (For example the NT Performance Monitor is an instrumentation entity for Windows NT, an operation system commercially available from the Microsoft Corporation of Redmond, Wash. Other operating system instrumentation entities are known.)

Each of the known instrumentation entities has a set of predetermined component parameters that it monitors.

The instrumentation entities that provide access to component parameters often report parameter information in formats that are unique to the particular instrumentation entity that is being used. If two instrumentation entities were to provide access to CPU utilization of a computer server, for example, the instrumentation entities likely would report CPU utilization information in different ways using different formats. Thus, information technology technicians must be familiar with the different formats and content of information reported by the various instrumentation entities that are used in the network that they service. Such training increases the costs of network maintenance.

Accordingly, there is a need in the art for a computer network management technique that reduces the variety of formats and content of instrumentation entity alerts and yet provides effective information for use by information technology technicians.

SUMMARY

According to an embodiment, the present invention may provide a data collection system for a computer network. The data collection system may include a data collection agent having a harmonization library and a plurality of data sources distributed throughout the computer network. The data collection agent is provided in communication with the data sources via instrumentation entities of the components.

BRIEF DESCRIPTION OF THE DRAWINGS

FIG. 4 is a flow diagram of a method in accordance with an embodiment of the present invention.

FIG. 5 is a flow diagram of a method in accordance with another embodiment of the present invention.

DETAILED DESCRIPTION

Embodiments of the present invention provides a data collection agent for a computer network. The data collection agent receives alerts from a plurality of data sources, harmonizes the alerts and reports harmonized alerts to an application console. Harmonization permits like-kind alerts from different instrumentation entities to be presented to a technician using similar formats.

Figure 1:
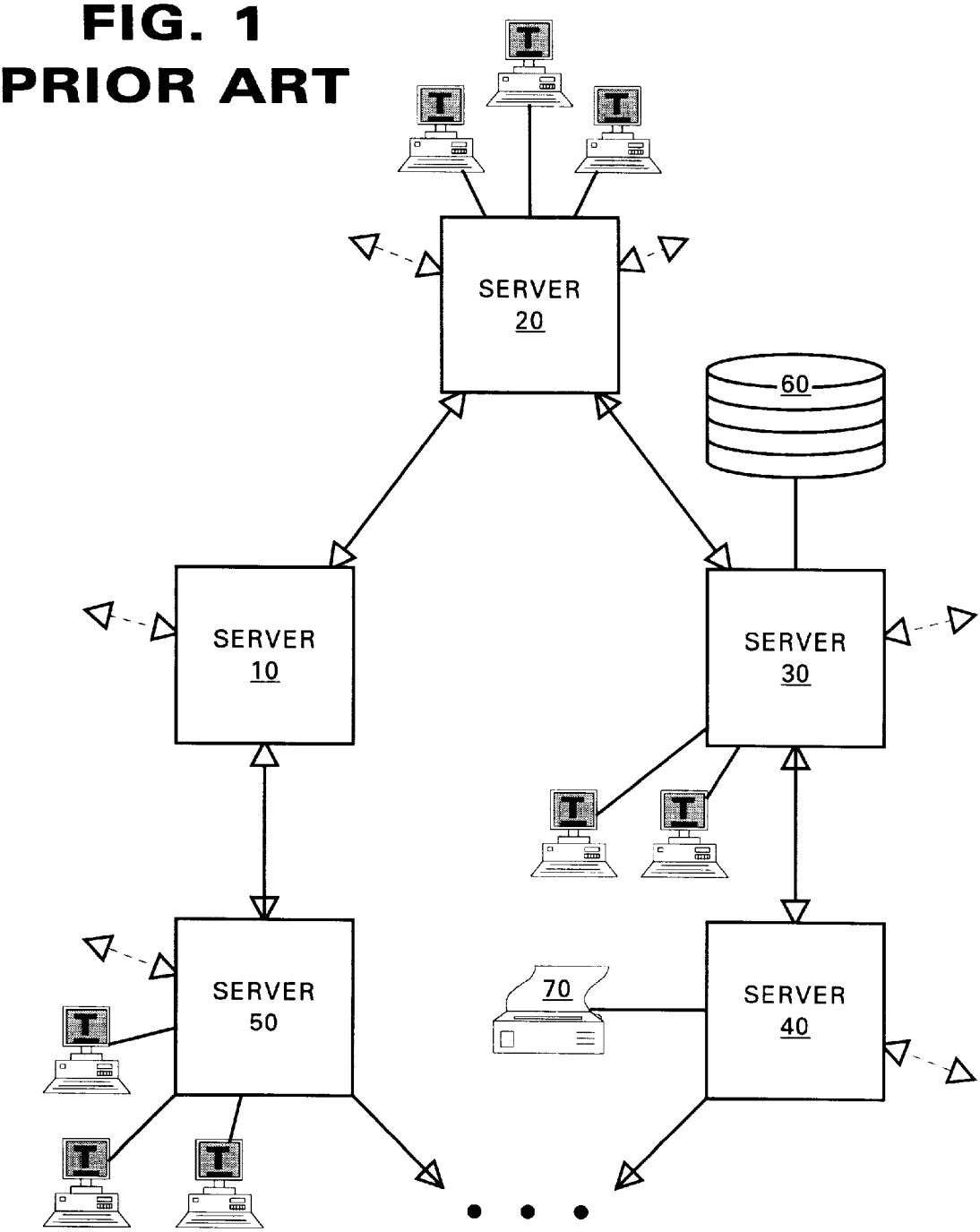
FIG. 1 is a block diagram of an exemplary computer network suitable for use with an embodiment of the present invention.

FIG. 1 illustrates an exemplary computer network populated by a number of servers 10–50. Although servers 10–50 are shown as interconnected using a ring-based architecture, the discussion of the present invention should be understood to transcend any particular network architecture. In the example, server 30 may be a disk controller provided in communication with one or more memory storage units 60 and server 40 may be a printer manager provided in communication with one or more printers 70. The servers 10–50 also may provide service to multiple user terminals T and other servers (not shown).

Figure 2:
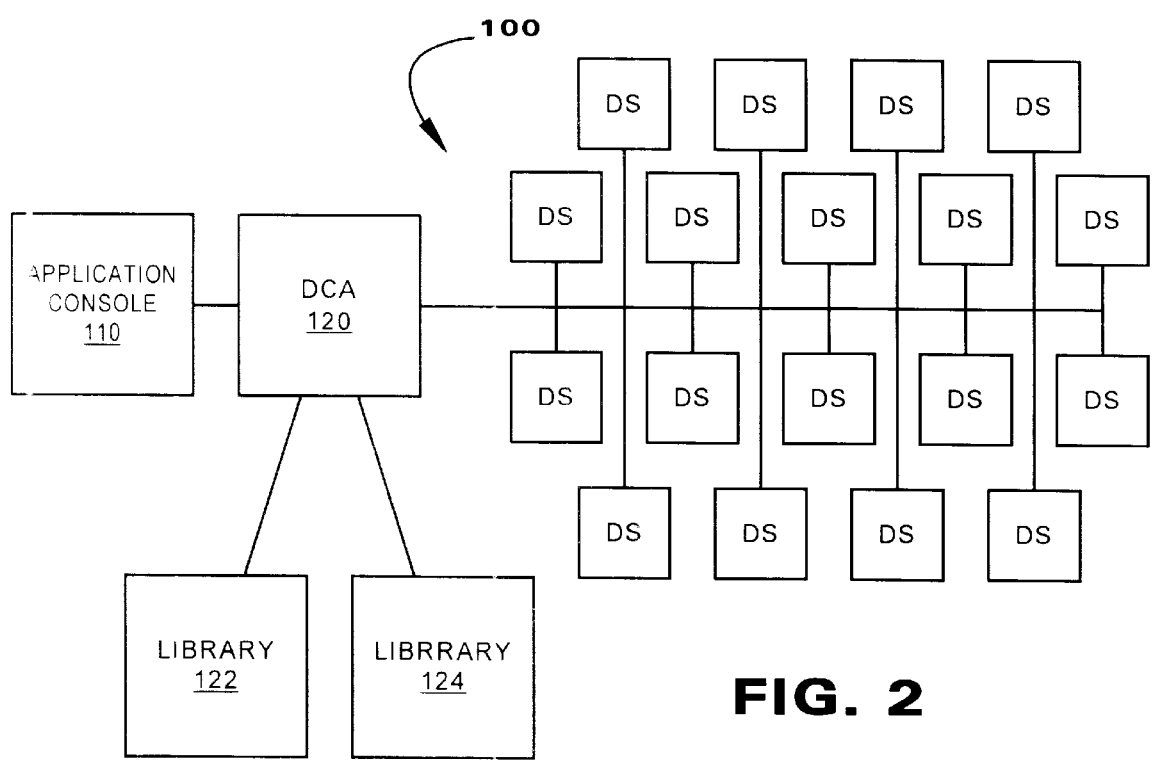
FIG. 2 is a block diagram of a data collection system constructed in accordance with an embodiment of the present invention.

FIG. 2 is a block diagram of a data collection system constructed according to an embodiment of the present invention. FIG. 2 illustrates an application console 110, a data collection agent ("DCA") 120 and a plurality of data sources DS. The application console 110 and DCA 120 may be software entities provided in a computer network. The data sources DS represent the hardware and/or software parameters that are monitored by the DCA 120. They are distributed among the various servers 10–50, terminals T and peripherals 60–70 of the computer network (FIG. 1).

The application console 110 provides user access to the DCA 120 to configure its operation. Typically, it is resident on a single terminal T of the computer network (FIG. 1). The application console 110 may include graphical user interfaces to permit the technician to configure the DCA 120. It also may include queuing buffers and presentation interfaces to report alerts received from the DCA 120 to the technician.

The DCA 120 is a software entity that provides an interface between the application console 110 and the data sources DS. It may include a plurality of libraries 122, 124 that control the DCA's operation. In a first embodiment, the DCA 120 may be distributed across all components 10–70, T of the computer network (FIG. 1). In practice, a distributed DCA 120 may be easiest to implement. Each DCA 120 of such a distributed embodiment would collect data from the data sources only from the component on which it resides.

Alternatively, the DCA 120 may be resident on a single server (e.g., server 10) of the computer network. In this embodiment, the DCA 120 monitors all components 10–70, T of the computer network, not merely those of the server 10 on which it resides. Implementation of the single-DCA 120 embodiment requires that the DCA server 10 communicate with the other components 20–50, T to implement the data collection functions of the present invention. Thus, this embodiment of the invention, while feasible, consumes communication bandwidth of the computer network and requires that the DCA 120 be able to receive and process multiple communications from servers in real-time.

Figure 3:
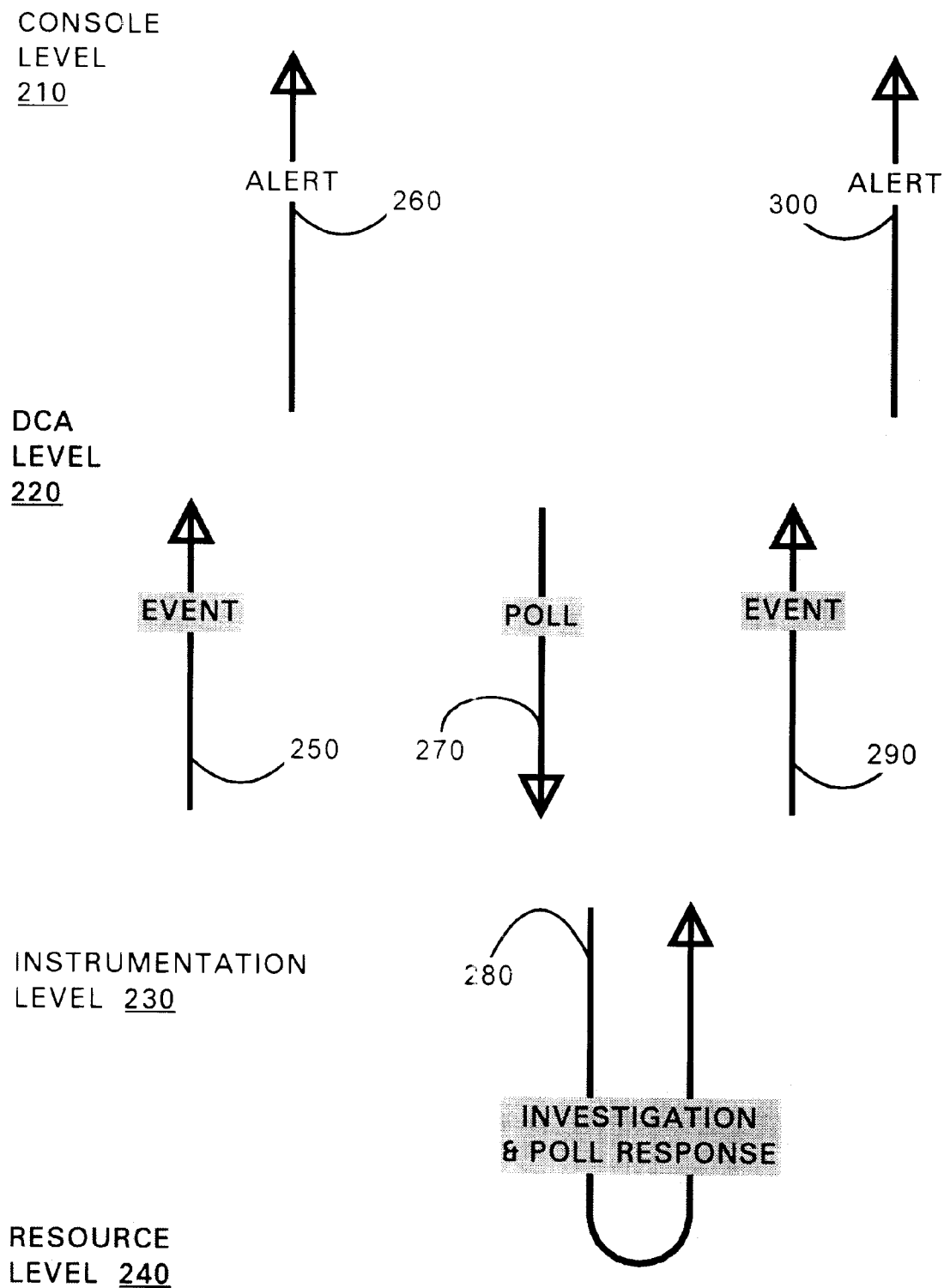
FIG. 3 is an illustration of the software layers of a data collection agent in accordance with an embodiment of the present invention.

FIG. 3 is a diagram illustrating various layers of software or firmware that may be operating according to an embodiment of the present invention. The layers include the console level 210, the DCA level 220, the instrumentation level 230 and the resource level 240. The resource level 240 corresponds to data sources DS from FIG. 2. Parameter information is obtained from the resource level 240.

The instrumentation level is a level 230 of software on which the known instrumentation entities operate. Again, instrumentation entities typically contain libraries that identify predefined events on which an alert should be triggered. These predetermined events typically are not configurable by a system user.

The DCA level 220 is a level of software that provides data collection functions according to an embodiment of the present invention. At the DCA level 220, the DCA 120 includes several libraries (FIG. 2 122,124) that determine how the DCA 120 operates. The first library 122, a "harmonization library," includes tables that permit the DCA 120 to harmonize alerts received from the various instrumentation entities. Thus, there may be a first table that harmonizes alerts from an OS instrumentation entity, a second table that harmonizes alerts from a DMI instrumentation entity and a third table that harmonizes alerts from an SNMP instrumentation entity. The first library 122 may have as many tables as instrumentation entities that may be present in the computer network. When DCAs 120 are distributed throughout the network, the first library 122 on a given component (e.g., RAID controller 60) need only have tables for as many instrumentation entities as are resident on the component 60.

The first library 122 may possess an open architecture to permit expansion of the library as new instrumentation entities become known. Thus, the DCA 120 may include additional instrumentation entities that are defined after release of the DCA 120 into the computer network. The open architecture of the DCA 120 also permits the DCA 120 to be used with network components for which custom instrumentation entities may be defined.

The DCA 120 also may have a second library 124 that defines custom, user-determined events for which the DCA 120 may collect data. The DCA 120 not only receives alerts that may be generated by the various instrumentation entities (which generally are not user-defined) but also may poll the instrumentation entities to collect system information on a user-defined basis.

FIG. 3 illustrates the progression of information through the layers for both an instrumentation entity alert and for a DCA poll. In the first case, the instrumentation entity alert, the instrumentation entity communicates with the data sources of the resource level 240 according to techniques that are known in the art (communication not shown). When the instrumentation entity identifies an event, it reports the event to the DCA level 220 (250). The DCA 120 harmonizes the event through reference to the first library 122. The DCA 120 generates an alert and transmits the alert to the console level 210 (260).

According to the embodiment, the first library 122 also may contain information that permits the DCA 120 to filter events or poll results received from the instrumentation layer. Users may determine that certain events are not so important as to require an alert to the level 210 console even though they may have been defined in an instrumentation entity to generate an event. A user, such as an information technology technician, may define conditions on the reporting of an alert generated by an instrumentation entity. The conditions also may be stored in the first library 122.

In the second case, the poll, the second library 122 determines when and how to poll a data source in the resource layer. The DCA 120 communicates with an instrumentation entity through which the DCA 120 may gain access to the data source (270). The instrumentation entity communicates with the data source DS and obtains parameter information through techniques that, again, are known in the art (280). The instrumentation entity returns poll results to the DCA level 220 (290). The DCA 120 refers to the second library 124 to determine how to report the poll results to the console level 210 (300).

FIG. 4 illustrates a method of operation of the DCA 120 according to an embodiment of the present invention. The method illustrated in FIG. 4 may be performed to process the instrumentation entity alert.

The method begins when the DCA 120 determines whether an event has been received from an instrumentation entity (Step 1010). Events from instrumentation entities may be buffered upon receipt for later processing or, alternatively, they may cause interrupts to the DCA 120 for immediate processing. In either case, when such an event is received, the DCA 120 determines whether the received event qualifies as an alert (Step 1020). If so, the DCA 120 normalizes the alert (Step 1030) through reference to the first library 122 as described. It then reports the alert to the application console (Step 1040). At the conclusion of step 1040 or if, at step 1020, the event does not qualify as an alert, processing of the instrumentation entity alert concludes.

As described above, in one embodiment of the present invention, the first library 122 optionally may be used to filter events that are received from instrumentation entities. Other embodiments of the present invention need not perform such filtering. Accordingly, the interrogation performed at step 1020 may be omitted consistent with the principles of the present invention.

FIG. 5 illustrates processing that may be performed when the DCA 120 polls data sources according to an embodiment of the present invention. Polling begins at step 2010 when the data source determines whether it is time to poll a data source. The DCA 120 communicates with the instrumentation entity to cause a poll to be made of the data source (Step 2020). Sometime later, the DCA 120 receives poll responses (Step 2030). The DCA 120 determines whether the poll responses qualify as an alert (Step 2040). If so, the DCA 120 normalizes the alert and reports the alert to the application console (Steps 2050–2060). If not, processing of the polling results concludes.

According to an embodiment of the present invention, the DCA 120 is provided as program instructions executed by one or more of the network components 10–70, T. Typically, the program instructions may be stored in a long term storage unit (not shown) of the component such as in an electrical, magnetic or optical memory and retrieved by a processing element (also not shown) of the component 10–70, T for execution.

As discussed the data collection system provides a data collection technique in a computer network that harmonizes alerts to be reported to information technology technicians or other system users. The data collection scheme also provides users with an opportunity to define alerts in addition to those that are normally predefined by component manufacturers. It is believed that the user-defined alert functionality of the present invention will provide information technology technicians with an opportunity to perform "preventative maintenance" upon computer networks. In this implementation, preventative maintenance may permit a system operator to identify and proactively cure system deterioration before it impairs performance of a computer network.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A data collection system, comprising:
   a data collection agent having a harmonization library, and
   a plurality of data sources distributed among components of a computer network, wherein the data collection agent is provided in communication with the data sources via different instrumentation entities of the components and wherein the harmonization library includes a harmonization table to harmonize alerts received from each of the different instrumentation entities.

2. The data collection system of claim 1, wherein the data collection agent is distributed among components of the computer network.

3. The data collection system of claim 2, wherein the harmonization library on one of the components includes harmonization tables only for the instrumentation entity on the one component.

4. The data collection system of claim 1, wherein the data collection agent is resident on a single component of the computer network.

5. The data collection system of claim 1, further comprising an application console in communication with the data collection agent.

6. The data collection system of claim 1, wherein the harmonization table is for a desktop management interface instrumentation entity.

7. The data collection system of claim 1, wherein the harmonization table is for an Simple Network Management Protocol (SNMP) instrumentation entity.

8. The data collection system of claim 1, wherein the harmonization table is for an operating system instrumentation entity.

9. A data collection system, comprising:
   a data collection agent having a polling library, and
   a plurality of data sources distributed among components of a computer network, wherein the data collection agent is provided in communication with the data sources via different instrumentation entities of the components and wherein the polling library includes definitions of polling parameters to poll the plurality of different instrumentation entities and the polling library further includes harmonization tables for the instrumentation entities to harmonize alerts received responsive to the polls.

10. The data collection system of claim 9, wherein the data collection agent itself is distributed among components of the computer network.

11. The data collection system of claim 9, wherein the data collection agent is resident on a single component of the computer network.

12. The data collection system of claim 9, further comprising an application console in communication with the data collection agent.

13. A method of processing instrumentation entity events, comprising
   receiving data representing an event from a plurality of different instrumentation entities, wherein the event indicates a network component's operating condition,
   harmonizing the events received from the plurality of different instrumentation entities using a harmonization library, and
   outputting alerts representative of the harmonized events, wherein the alerts are outputted using similar formats.

14. The method of claim 13, wherein the harmonizing step comprises:
   retrieving harmonization data from the harmonization library based upon the instrumentation entity event.

15. A method of processing data source polls, comprising:
   polling a plurality of instrumentation entities,
   receiving parameter information from the plurality of instrumentation entities,
   determining whether the parameter information meets a predetermined condition, and
   when the parameter information meets the predetermined condition, harmonizing the parameter information from the plurality of instrumentation entities using similar formats and outputting the harmonized parameter information.

16. A computer readable medium having stored thereon program instructions that, when executed by a network component, causes the component to:
   poll a plurality of different instrumentation entities for parameter information,
   determine whether the parameter information meets a predetermined condition, and
   when the parameter information meets the predetermined condition, harmonize alerts generated based on the parameter information.

17. A computer readable medium having stored thereon program instructions that, when executed by a network component, cause the network component to:
   receive data representing events from a plurality of different instrumentation entities,
   harmonize the events received from the plurality of different instrumentation entities using a harmonization library,
   retrieve alert data from the harmonization library based on data of the events, and
   output an alert data representative of the harmonized events from the component.

* * * * *